(12) United States Patent
Gordon, Jr. et al.

(10) Patent No.: US 6,775,602 B2
(45) Date of Patent: Aug. 10, 2004

(54) METHOD AND SYSTEM FOR VEHICLE EMISSIONS TESTING THROUGH ON-BOARD DIAGNOSTICS UNIT INSPECTION

(75) Inventors: S. Jay Gordon, Jr., Louisville, KY (US); Clifton Mahaffey, Louisville, KY (US); Robert J. Tefft, Crestwood, KY (US); Robert Kennedy, Louisville, KY (US); Jess Yowell, Louisville, KY (US)

(73) Assignee: Gordon-Darby Systems, Inc., Louisville, KY (US)

(*) Notice: Subject to any disclaimer, the term of this patent is extended or adjusted under 35 U.S.C. 154(b) by 0 days.

(21) Appl. No.: 10/190,987

(22) Filed: Jul. 8, 2002

(65) Prior Publication Data

US 2004/0015278 A1 Jan. 22, 2004

Related U.S. Application Data

(60) Provisional application No. 60/303,980, filed on Jul. 9, 2001.

(51) Int. Cl.[7] .................... G01M 17/00; G06F 19/00; G01J 5/02
(52) U.S. Cl. ................ 701/33; 701/29; 701/30; 701/32; 701/35; 340/438; 250/339.05; 250/372; 250/338
(58) Field of Search ............... 701/29, 30, 32, 701/33, 35; 340/438; 250/339.05, 372, 338

(56) References Cited

U.S. PATENT DOCUMENTS

| | | |
|---|---|---|
| 3,938,377 A | 2/1976 | Converse, III et al. |
| 3,998,095 A | 12/1976 | Tinkham et al. |
| 5,369,976 A | 12/1994 | Ratton |
| 5,396,623 A | 3/1995 | McCall et al. |
| 5,408,215 A | 4/1995 | Hamburg |
| 5,548,713 A | 8/1996 | Petry et al. |
| 5,583,765 A * | 12/1996 | Kleehammer .................. 701/1 |
| 5,671,141 A | 9/1997 | Smith et al. |
| 5,719,396 A * | 2/1998 | Jack et al. ............... 250/338.5 |
| 5,726,450 A * | 3/1998 | Peterson et al. ......... 250/338.5 |
| 5,794,164 A | 8/1998 | Beckert et al. |
| 5,865,026 A | 2/1999 | Davey et al. |
| 5,996,337 A | 12/1999 | Blosser et al. |
| 6,003,307 A | 12/1999 | Naber et al. |
| 6,148,656 A | 11/2000 | Breton |
| 6,225,898 B1 | 5/2001 | Kamiya et al. |
| 6,240,722 B1 | 6/2001 | Busch et al. |
| 2002/0092988 A1 * | 7/2002 | Didomenico et al. ..... 250/338.5 |
| 2002/0138185 A1 * | 9/2002 | Trsar et al. ................... 701/33 |
| 2003/0040854 A1 * | 2/2003 | Rendahl et al. ............... 701/29 |

FOREIGN PATENT DOCUMENTS

| | | |
|---|---|---|
| WO | PCT/US99/21921 | 3/2000 |
| WO | PCT/CA00/00712 | 12/2000 |
| WO | PCT/US00/16657 | 12/2000 |

OTHER PUBLICATIONS

Agbar Technologies web pages, http://www.agbartech.com/Programs.html; downloaded Jul. 25, 2002.
Agbar Technologies web pages, http://www.agbartech.com/Massachussets.html.

* cited by examiner

*Primary Examiner*—Thomas G. Black
*Assistant Examiner*—Brian J. Broadhead
(74) *Attorney, Agent, or Firm*—Stites & Harbison, PLLC; David W. Nagle, Jr.

(57) ABSTRACT

A decentralized method and system for vehicle emissions testing preferably uses the OBD unit of the vehicle to be tested. A preferred implementation of the method and system includes a remote overview or supervisory location in communication with a plurality of decentralized inspection stations or test locations. Supervisory personnel at the remote overview location are in video and data communication with the inspection location and thus are able to monitor and audit all aspects of the OBD testing process, including a review of the actual test data.

14 Claims, 8 Drawing Sheets

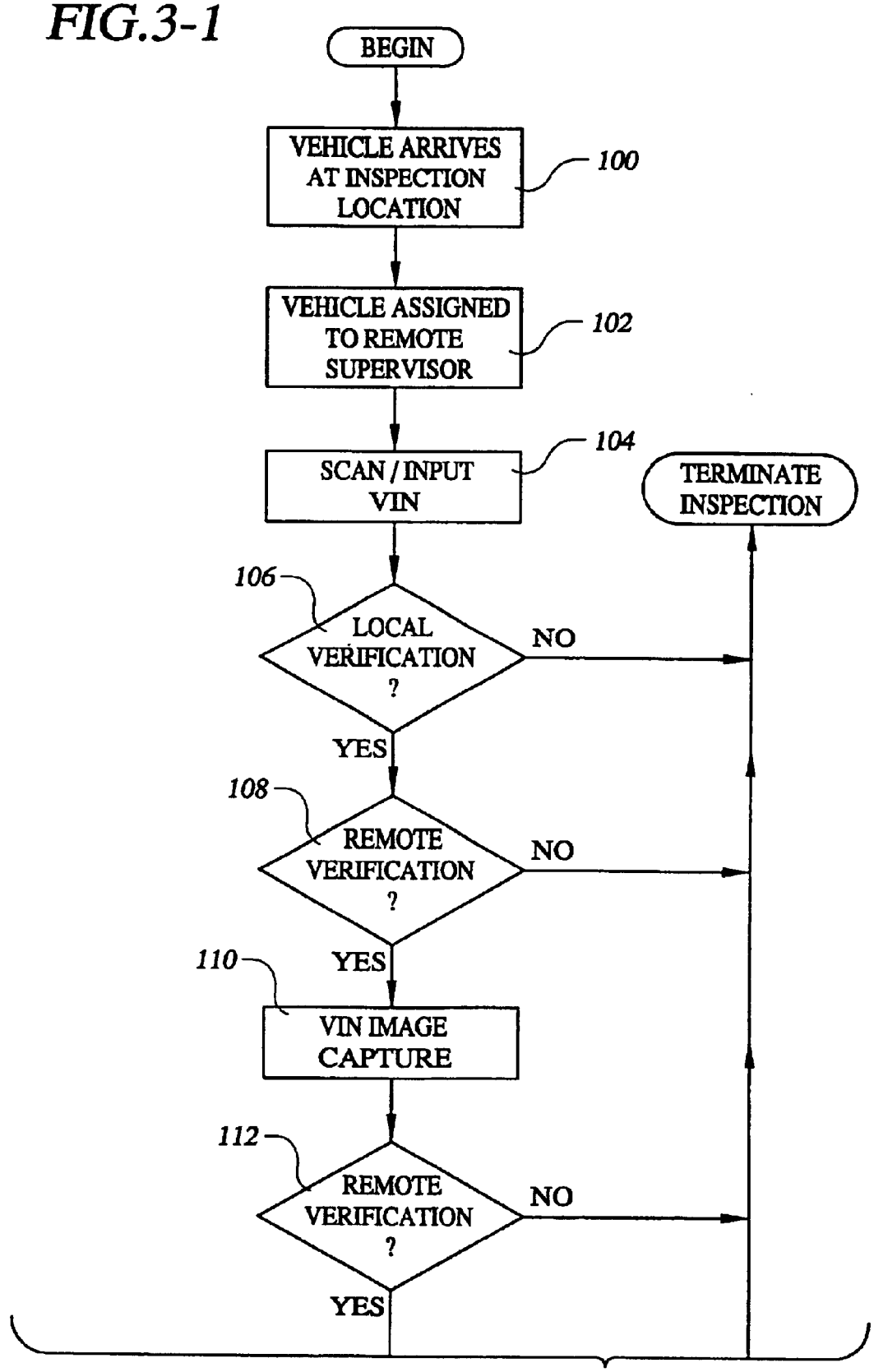

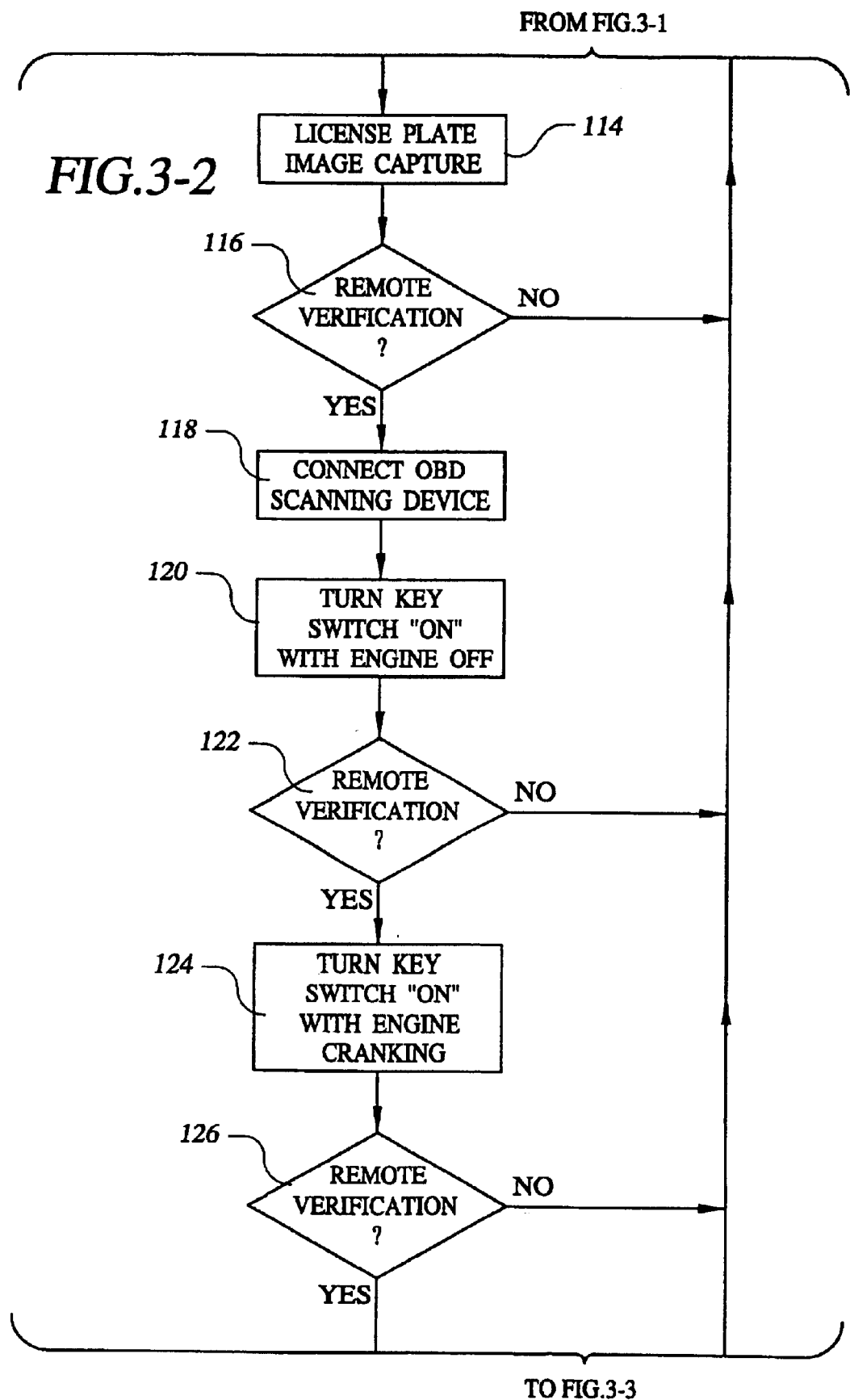

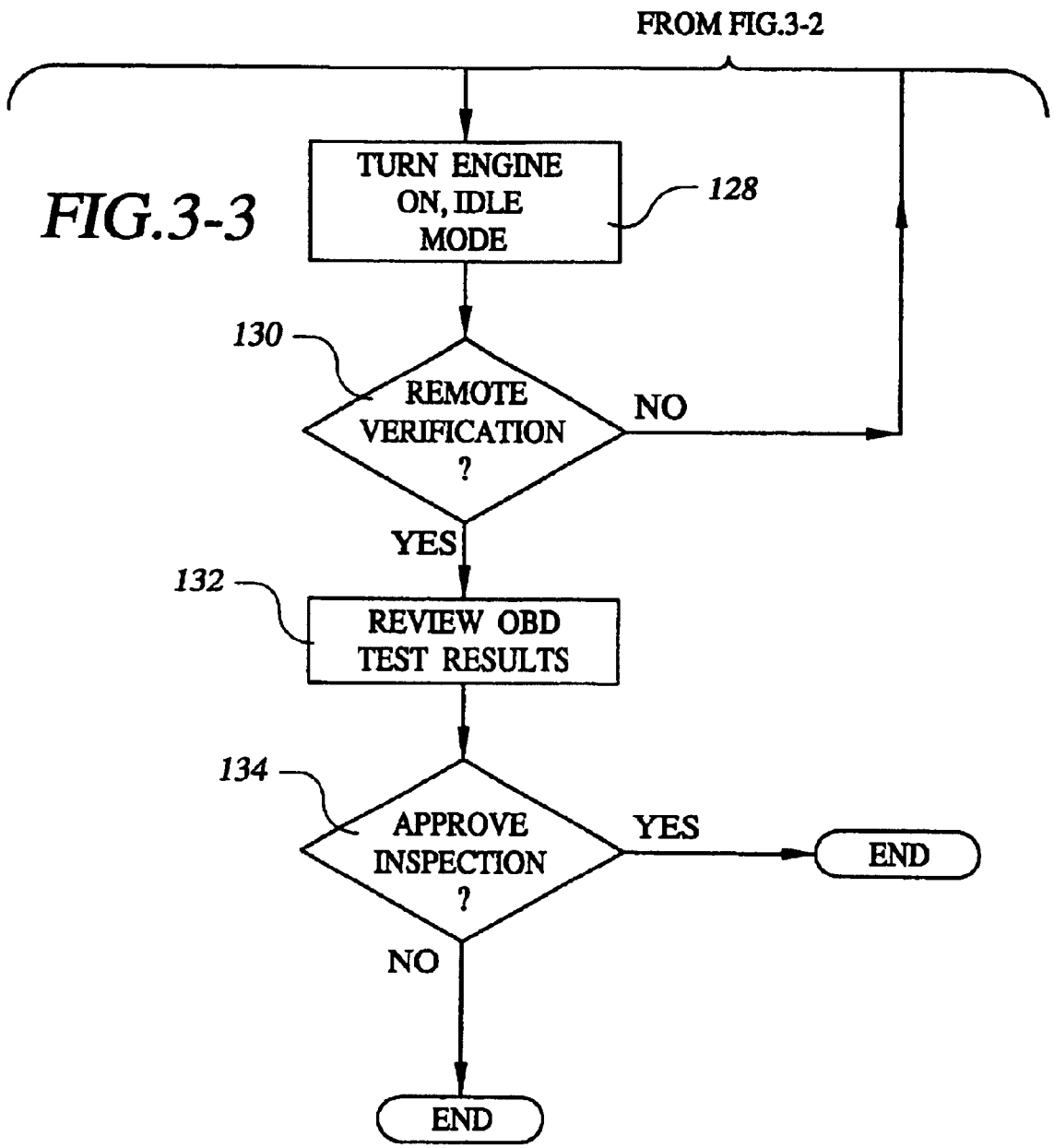

METHOD AND SYSTEM FOR VEHICLE EMISSIONS TESTING THROUGH ON-BOARD DIAGNOSTICS UNIT INSPECTION

CROSS REFERENCES TO RELATED APPLICATIONS

This application claims priority from U.S. Provisional Application Ser. No. 60/303,980 filed Jul. 9, 2001, and relates to a method and system for vehicle emissions testing. The entire disclosure contained in U.S. Provisional Application Ser. No. 60/303,980 is incorporated herein by this reference.

BACKGROUND OF THE INVENTION

The present invention relates to a method and system for vehicle emissions testing, and, more particularly, to a decentralized method and system that uses the On-Board Diagnostics ("OBD") unit of the vehicle to be tested, a method and system that combines the security and reliability of centralized emissions testing with the convenience of decentralized testing programs.

Recognizing the adverse effects that vehicle emissions have on the environment, the 1990 Clean Air Act requires that communities in geographic regions having high levels of air pollution implement Inspection and Maintenance ("I/M") programs for vehicles in the particular geographic regions. Such I/M programs are intended to improve air quality by periodically testing the evaporative and exhaust systems of vehicles in the community and ensuring their proper operation and maintenance. By ensuring that the evaporative and exhaust systems of vehicles are operational and properly maintained, air pollution resulting from vehicle emissions in the geographic region should be drastically reduced.

Currently, I/M programs in the United States typically employ some method of "tailpipe" testing as the primary means of inspection. Although there are several different variations in common tailpipe testing methods, the core function of tailpipe testing remains the same. First, a probe is attached to, or inserted into, the tailpipe of the vehicle being tested to collect exhaust as the engine of the vehicle is running. The collected exhaust is then introduced into a series of gas analyzers in order to determine its composition. Finally, a report of the amount of measured pollutants is generated.

Regardless of the specific tailpipe testing method used, all I/M programs can be classified as either centralized, decentralized, or a hybrid thereof. Centralized I/M programs require that vehicle owners take their vehicles to one of the community's centralized inspection stations. Each such inspection station is designed to maximize vehicle throughput without sacrificing test integrity and auditing ability. Since each inspection station in a centralized program is typically "test only" and often operated by an independent contractor retained by a governmental body, the inspection stations are generally very secure and serve as a deterrent to fraudulent testing practices. However, although centralized inspection stations offer the statistical tracking and fraud deterrent that the governmental body might desire, they are often criticized because they are not necessarily convenient to vehicle owners. Indeed, a community may decide in favor of motorist convenience and opt for a decentralized tailpipe testing program.

In a decentralized I/M program, a greater number of inspection stations is scattered throughout the community. These inspection stations are often located within a private business, such as a mechanic's repair shop, and are administered by the private citizens employed by the business. Therefore, no single central entity supplies the equipment and personnel required for the I/M program.

While decentralized testing is well-suited for customer convenience, the potential for fraudulent and inadequate testing is much greater than in a centralized program. As such, some practices have been implemented to serve as a fraud deterrent in decentralized test programs. For example, certification of a decentralized inspection station is often required. If a particular inspection station was found to be purposely passing non-compliant vehicles, its certification could be revoked, thereby preventing it from legally administering vehicle emissions tests. Of course, since purchasing the equipment required for vehicle emissions testing is an extremely expensive endeavor, the loss of certification serves as a severe financial disincentive to fraudulent and inadequate testing practices. Furthermore, the private business might also be stripped of other professional licenses or certifications required to operate the business, providing another disincentive to fraudulent and inadequate testing practices.

The Environmental Protection Agency ("EPA") has now developed a new mobile source emission factor model, referred to as MOBILE6, and has approved a new method of vehicle emission testing for use in I/M programs that makes use of the On-Board Diagnostics ("OBD") unit. This unit is installed on most of the vehicles manufactured since 1996 that are authorized to be operated in the U.S. Specifically, the OBD unit is designed for communication with an electronic scanning device that is temporarily connected to the vehicle, thereby allowing for prompt and efficient identification of any vehicle components or devices which the OBD unit believes to be malfunctioning. Included among the components monitored by the OBD unit are the vehicle's evaporative and exhaust systems, the systems which are the primary focus of I/M programs and vehicle emissions testing.

As mentioned above, MOBILE6 is a new mobile source emission factor model developed by the EPA. MOBILE6 uses a series of mathematical algorithms to determine if a community or geographic region is in compliance with the federal standards for mobile source (i.e., vehicular) emissions. A major factor in this mathematical computation is the credit assigned to the different types of tailpipe testing methods and OBD testing. The MOBILE6 model favors OBD testing, assigning a greater credit to such testing as compared to tailpipe testing methods. The high degree of credit assigned to OBD testing in the MOBILE6 model, along with its relative ease of use and low cost, make it a significant component of future I/M programs and vehicle emissions testing.

Of course, since OBD units are only installed on vehicle manufactured since 1996, OBD testing may be implemented in conjunction with existing I/M programs that employ tailpipe testing methods. It is not difficult to envision this OBD testing being incorporated into an existing centralized I/M environment. Specifically, since the centralized inspection stations are already established, a vehicle owner would simply go to the inspection station as before, but would have the OBD testing performed rather than traditional tailpipe testing. As mentioned above, since the inspection stations in a centralized program are often operated by an independent contractor retained by a governmental body, the inspection stations are generally very secure and serve as a deterrent to fraudulent testing practices.

However, implementing OBD testing in a decentralized I/M program raises serious issues concerning fraudulent and inadequate testing practices. While a current decentralized I/M program employing tailpipe testing methods could be expanded to include OBD testing, it could be further expanded such that a vehicle owner would not need to go to a mechanic or similar business for an emissions test. With OBD testing replacing traditional tailpipe testing methods, the amount of training and equipment needed to properly administer the test is drastically reduced. Whereas a skilled mechanic with properly maintained equipment was required for tailpipe testing methods, anyone with an OBD scanning device and a minimal amount of training can now perform OBD testing. Therefore, a private business or individual can enter the decentralized "test only" market for vehicle emissions testing without the certification a mechanic would earn and without the expensive equipment investment. In this scenario, the disincentives for fraudulently testing vehicles are greatly diminished. Furthermore, there is also a concern that unintentional passing of noncompliant vehicles will become more prevalent due to lack of supervision and training. Finally, while the administration of the OBD testing is of paramount importance, another concern arises with respect to data transfer. In current decentralized I/M programs, emission test data is often transferred from the inspection stations to a database at a central management facility via the Internet or dedicated phone line. Since OBD testing operations could be established with little financial investment, there is no guarantee that these operations would have facilities to securely and reliably transfer emission test data to the appropriate central management facility.

Such concerns cast a great deal of skepticism on the mass availability of accurate and secure OBD testing in a decentralized I/M environment. From the possibilities of fraudulent testing practices and erroneous test results to the uncertainty of data reporting and accuracy, there is clearly a need for developing a structured approach to implementing OBD testing in a decentralized I/M environment.

It is therefore a paramount object of the present invention to provide a decentralized method and system for vehicle emissions testing that uses the OBD unit of the vehicle to be tested, a method and system that combines the security and reliability of centralized OBD testing with the speed and accessibility of decentralized testing programs.

This and other objects and advantages of the present invention will become apparent upon a reading of the following description.

SUMMARY OF THE INVENTION

The present invention is a decentralized method and system for vehicle emissions testing that preferably uses the OBD unit of the vehicle to be tested, a method and system that combines the security and reliability of centralized emissions testing with the convenience of decentralized testing programs.

A preferred implementation of the method and system of the present invention includes a remote overview or supervisory location in communication with a plurality of decentralized inspection stations or test locations. Supervisory personnel at the remote overview location communicate with the inspectors at the individual test locations through an Internet connection, satellite communications, or similar means of data transport. The remote overview location operates much like a bank of hotline operators. At the beginning of an emissions test, the inspector at a particular inspection location is randomly assigned to a test supervisor at the remote overview location. This test supervisor is in video and data communication with the inspection location and thus is able to monitor and audit all aspects of the OBD testing process, including a review of the actual test data. If there is any perceived impropriety in the testing (e.g., suspicion of fraud, inadequate testing, or equipment malfunction), the test supervisor can disapprove of the test and reject its results. Furthermore, the remote overview location also preferably serves as a central hub for the receipt of all data resulting from the emissions testing, ensure that all pertinent data is properly transferred to and received by the governmental body that maintains the vehicle inspection records.

DESCRIPTION OF THE FIGURES

FIG. 3 is a flow chart depicting the general functionality of the preferred implementation of the method and system of the present invention.

DETAILED DESCRIPTION OF THE INVENTION

The present invention is a decentralized method and system for vehicle emissions testing that uses the OBD unit of the vehicle to be tested, a method and system that combines the security and reliability of centralized emissions testing with the convenience of decentralized testing programs.

Figure 1:
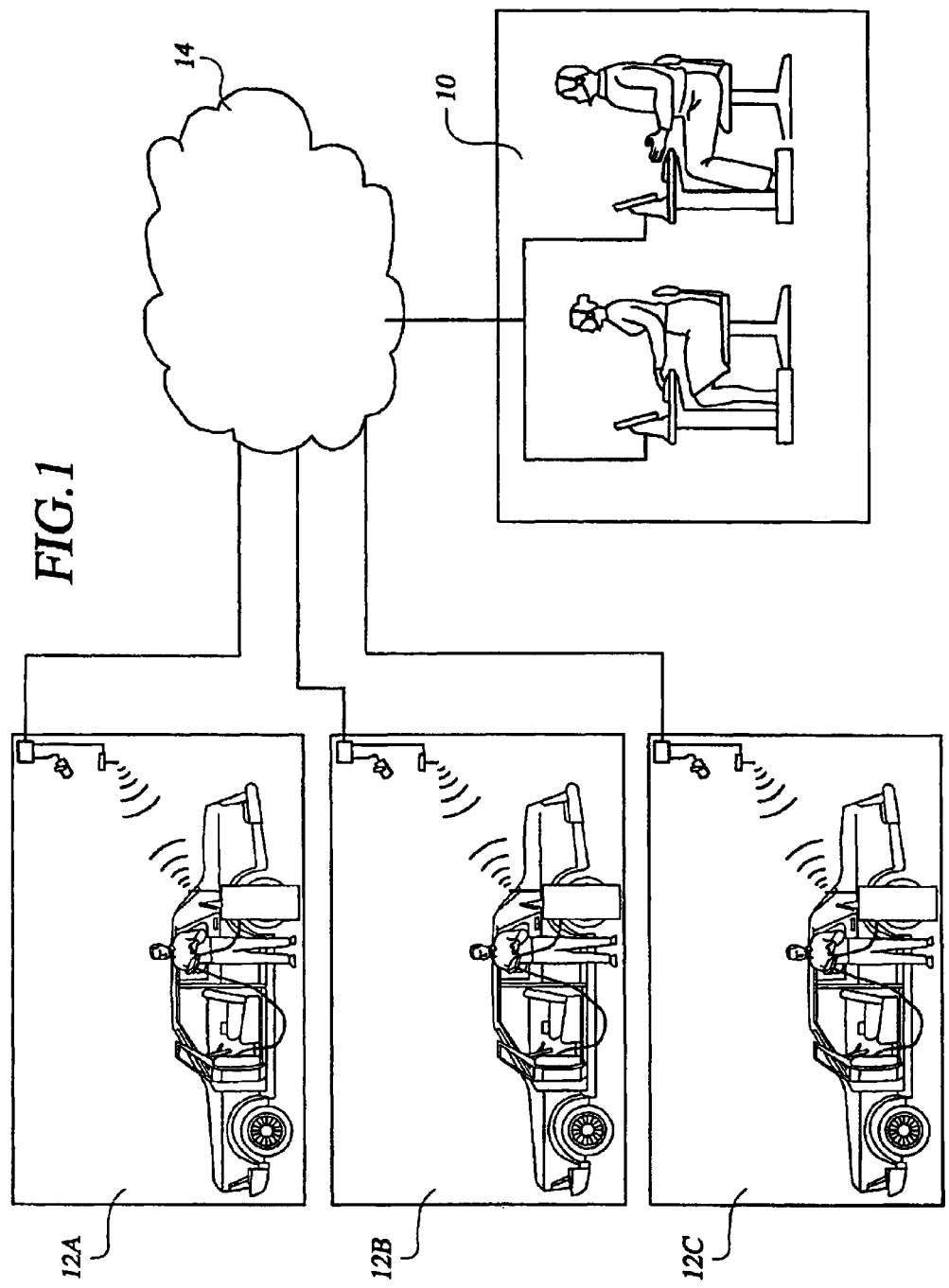
FIG. 1 is a schematic view of a preferred implementation of the method and system of the present invention, including a remote overview or supervisory location in communication with a plurality of decentralized inspection stations.

FIG. 1 is a schematic view of a preferred implementation of the method and system of the present invention, including a remote overview or supervisory location 10 in communication with a plurality of decentralized inspection stations or test locations 12A, 12B, 12C. Supervisory personnel at the remote overview location 10 communicate with the inspectors at the individual test locations 12A, 12B, 12C through an Internet connection, satellite communications, or similar means of data transport, generally indicated by reference numeral 14. Of course, although a single supervisory location 10 is illustrated in FIG. 1, multiple supervisory locations could be incorporated in to the method and system of the present invention without departing from the spirit and scope of the present invention. Similarly, although three decentralized inspection stations 12A, 12B, 12C are illustrated in FIG. 1 for purposes of example, a virtually infinite number of inspection stations could be incorporated into the method and system of the present invention without departing from the spirit and scope of the present invention.

Referring still to FIG. 1, the remote overview location 10 housing the supervisory personnel is intended to operate much like a bank of hotline operators. At the beginning of an OBD test, the inspector at a particular inspection location is randomly assigned to a test supervisor at the remote overview location 10. This test supervisor will be in video, and possibly audio communication, with the inspector; thus, the test supervisor will be able to monitor all aspects of the OBD testing process. Furthermore, the remote overview location 10 will also serve as a central hub for the receipt of all data resulting from the OBD testing. This enables the test supervisors to ensure that all pertinent data (e.g., vehicle identification information, test results, etc.) has been properly transferred to and received by the governmental body that maintains the vehicle inspection records.

Figure 2:
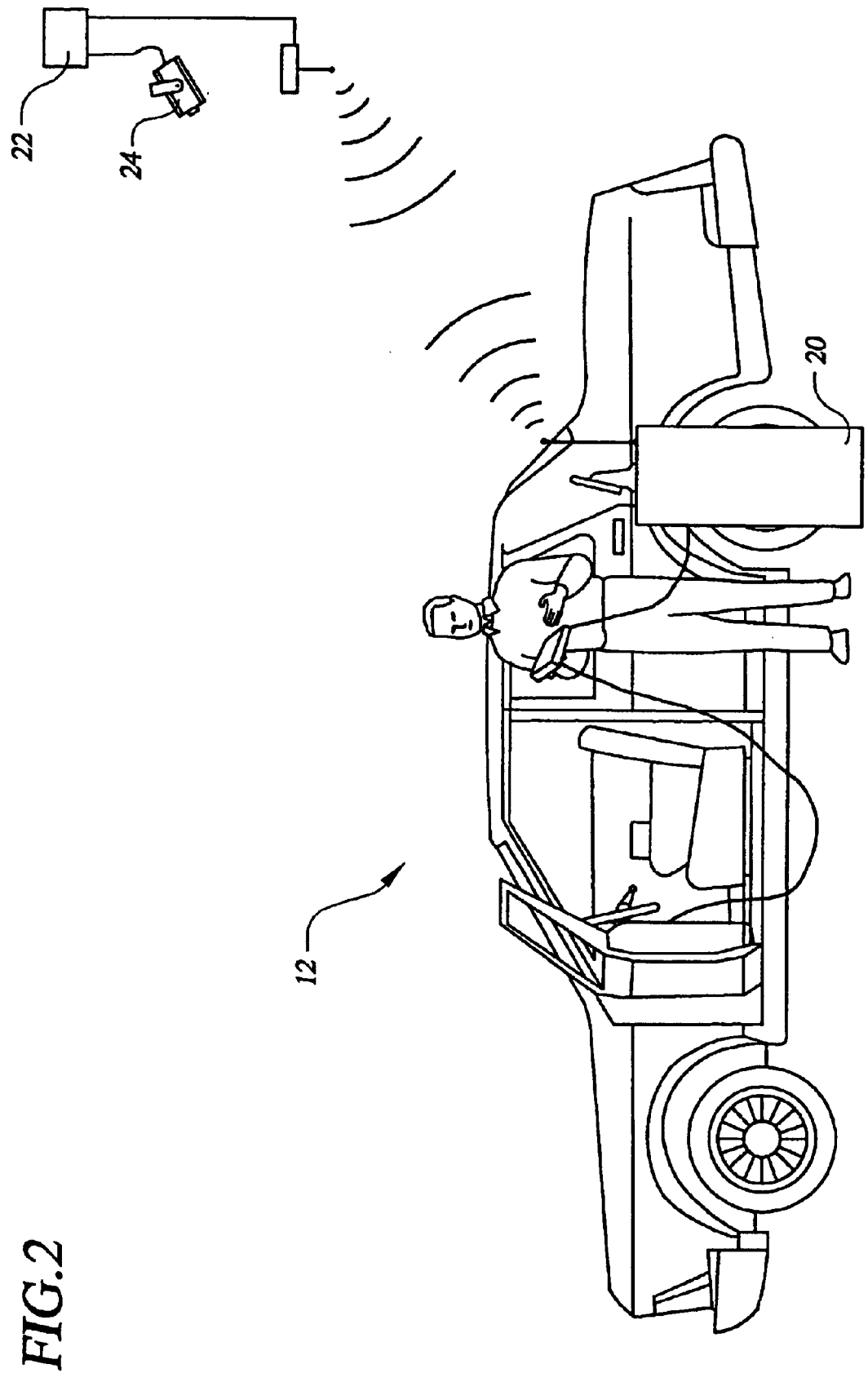
FIG. 2 is a view of one of the decentralized inspection stations in accordance with the preferred implementation of the method and system of the present invention.

Referring now to FIG. 2, each inspection location 12 is designed to allow the inspector to administer the OBD test and properly transfer data resulting from the test to the test supervisor at the remote overview location 10 (as shown in FIG. 1). At the inspection location 12, the inspector will be provided with a mobile computing device 20 and associated software that preferably includes: integrated bar code recognition hardware and software; substantially portable digital video capture equipment; an OBD scanning device; one or more displays for viewing test procedures and results; and a means (preferably wireless) of communicating with data transfer equipment 22 (e., a radio transceiver). This data transfer equipment 22 serves as the link between the inspection location 12 and the remote overview location 10, facilitating the transfer of data and information between the inspection location 12 and the remote overview location 10, preferably though an Internet connection, satellite communications, or similar means of data transport. Of course, other known means of data communication could be used without departing from the spirit and scope of the present invention.

Referring now to the flow chart of FIG. 3, in this preferred implementation of the method and system of the present invention, the OBD testing process commences when a vehicle arrives at the inspection location 12 for OBD testing, as indicated by block 100. Then, as mentioned above, a test supervisor at the remote overview location 10 is randomly assigned to monitor the testing, as indicated by block 102. In this regard, as shown in FIG. 2, the inspection location 12 is designed such that the vehicle to be tested can be observed by an overview camera 24, which relays substantially real-time video images of the vehicle and the inspection location 12 to the assigned test supervisor at the remote overview location 10 (as shown in FIG. 1) through the data transfer equipment 22. The overview camera 24 is preferably positioned in such a manner that the make and model of the vehicle can be easily ascertained, and such that the test supervisor has a view of the interior of the vehicle. In this regard, and as will become clearer from the description that follows, it is only necessary that the overview camera 24 be located such that the test supervisor can view the position of the inspector inside the vehicle; in other words, the overview camera 24 need not provide a view of the interior of the vehicle itself.

Also, although not described in connection with the functionality illustrated in FIG. 3, it is contemplated and preferred that a remote test supervisor can audit the activities of a inspector at any time by activating or turning on the overhead camera 24 (without the knowledge of the inspector) to capture a complete photographic history of the inspection. In other words, the overhead camera 24 would capture all activities of the inspector rather than only the specific activities described below with reference to the flow chart of FIG. 3 and the representative data screens of FIGS. 4–6. Such auditing is used to ensure complete compliance with all applicable testing procedures.

Returning to the flow chart of FIG. 3, the inspector must first verify the identification of the vehicle through the vehicle identification number ("VIN"). Specifically, by using the bar code recognition hardware and software that is integral to the mobile computing device 20, the inspector scans the bar-coded VIN, if available. If a bar-coded VIN is not available or is otherwise inaccessible, or if the inspector does not have the requisite bar code recognition hardware and software, it is also contemplated that the inspector be able to manually enter the VIN through a keyboard, touch screen, or similar input device. This scanning/inputting of the VIN is indicated by block 104 of FIG. 3. Although not shown in the flow chart of FIG. 3, VIN-decoding software associated with the mobile computing device 20 allows for a derivation of pertinent information about the vehicle being inspected, including the manufacturer, make, and model year of the vehicle. The software then allows access to and communication with a database that allows for retrieval of all pertinent information about the vehicle based on its VIN. Such pertinent information is displayed for review by the inspector on a standard computer monitor or similar display associated with the mobile computing device 20 for verification of the identity of the vehicle. Specifically, as indicated by decision 106 of FIG. 3, the inspector makes an initial determination as to whether the displayed information is consistent with his physical examination of the vehicle. If so, the testing procedure continues. If not, the test can be terminated.

The information derived from the VIN is also communicated to the test supervisor at the remote overview location 10 (as shown in FIG. 1) through the data transfer equipment 22 so that the information can be compared against the image shown by the overview camera 24. Alternatively, the test supervisor could independently access a database to determine the pertinent information about the vehicle based on its VIN to confirm the accuracy of the information transmitted from the test location 12. In any event, as indicated by decision 108 of FIG. 3, the test supervisor confirms the displayed information is consistent with the video image of the vehicle. If so, the testing procedure continues. If not, the test can be terminated.

Through such an identification and confirmation procedure, it is ensured that the vehicle the inspector claims to be inspecting is indeed the vehicle that is being tested.

In this preferred implementation of the method and system of the present invention, to further verify the identity of the vehicle, the inspector can use the digital video capture equipment (which is integrally linked to the mobile computing device 20 shown in FIG. 2) to capture an image of the vehicle's VIN, as indicated by block 110 of FIG. 3. This image is also communicated to the test supervisor at the remote overview location 10 (as shown in FIG. 1) through the data transport equipment 22 as a further means of vehicle identification. If the displayed image of the VIN is consistent with the prior information and data, as determined at decision 112, the testing procedure continues. If not, the test can be terminated. As a final note with respect to the VIN, the image of the VIN can be retained for record-keeping purposes associated with the particular I/M program.

Figure 4:
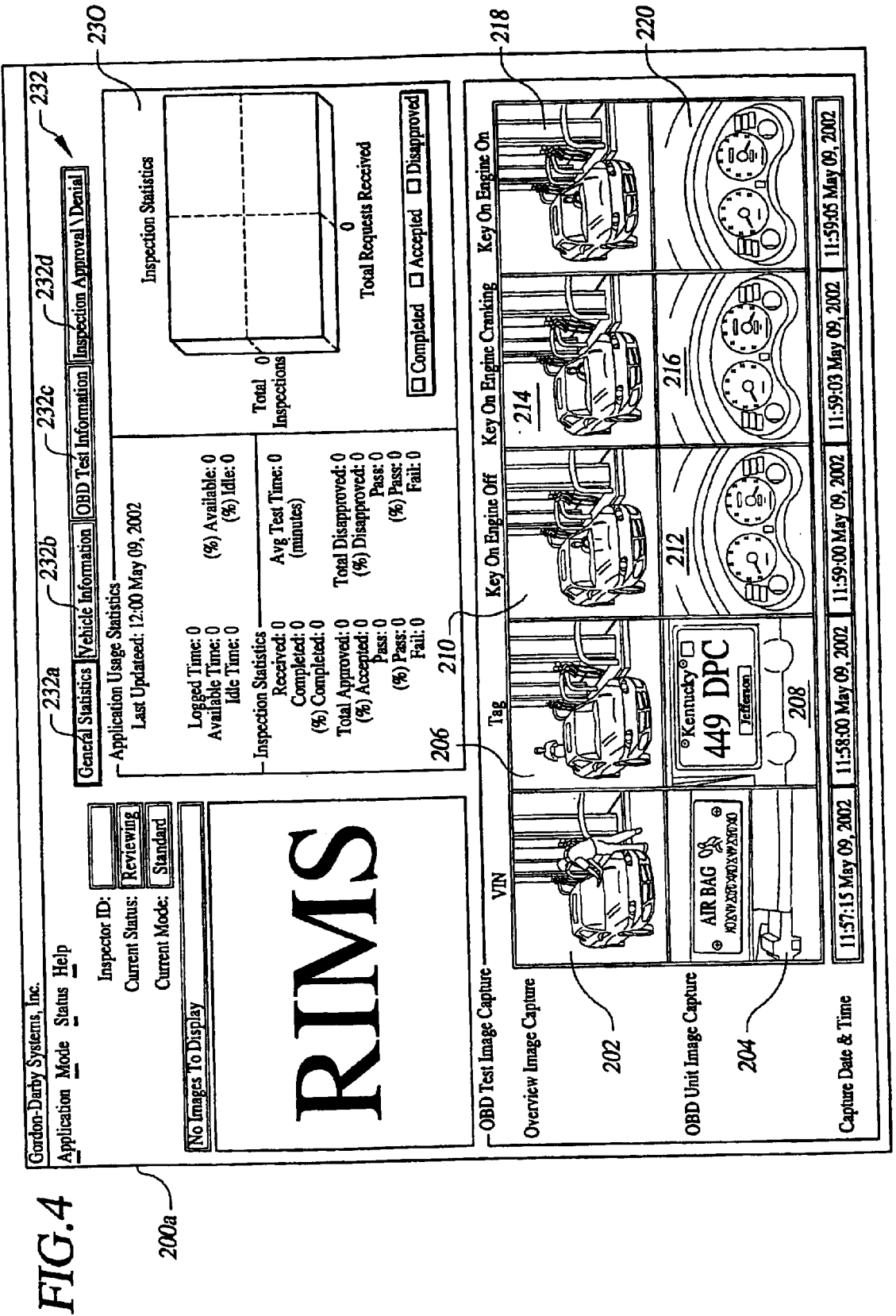
FIGS. 4–6 are representative examples of data screens displayed at the remote overview location on a conventional personal computer in the preferred implementation of the method and system of the present invention.
Figure 5:
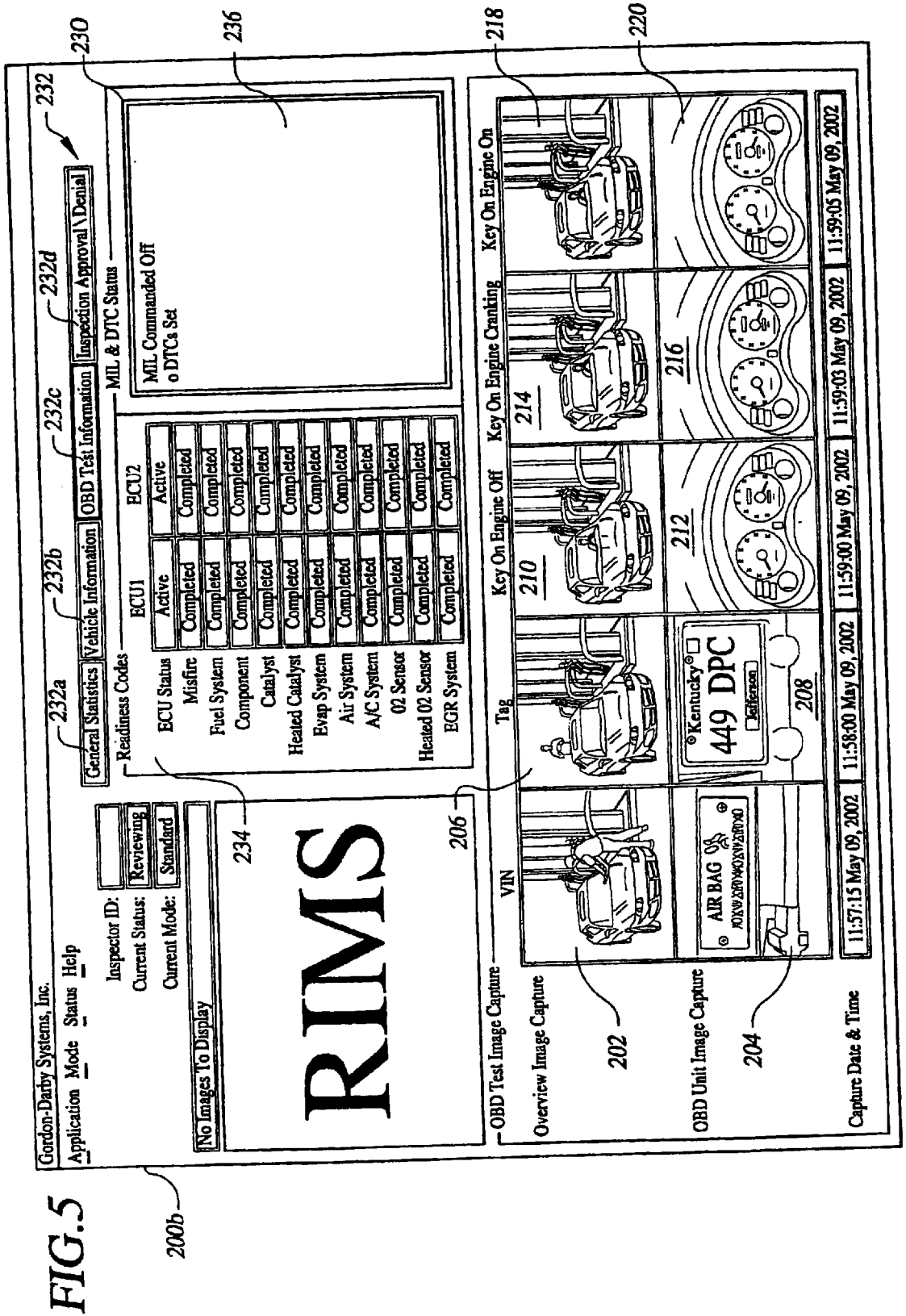
Figure 6:
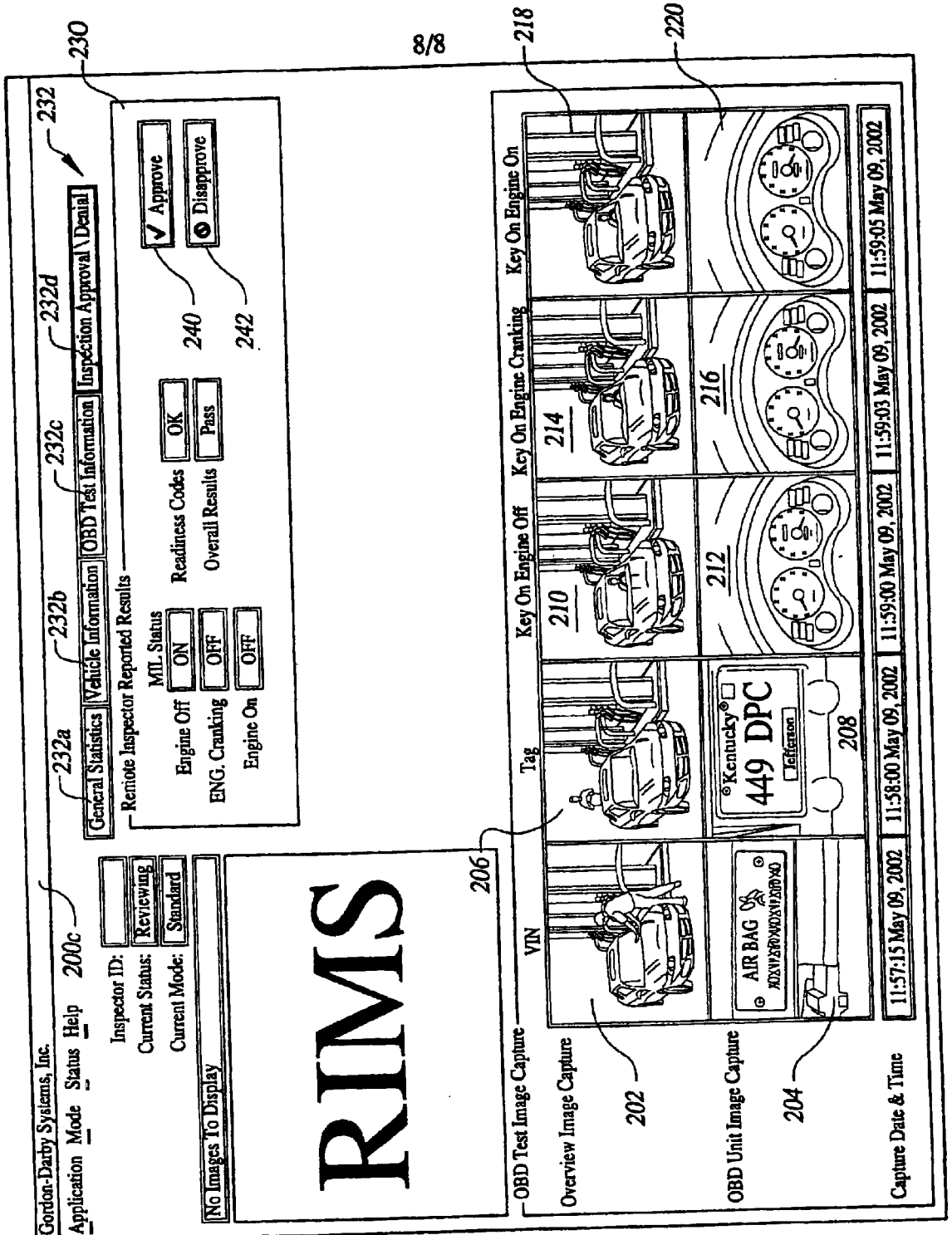

To provide a more complete understanding of the information and data that is communicated to the test supervisor, FIGS. 4–6 are representative examples of data screens displayed at the remote overview location 10 on a conventional personal computer in this preferred implementation of the method and system of the present invention. Referring specifically to FIG. 4, with respect to the verification of the VIN, the test supervisor can view a first image 202 in the lower portion of the data screen 200a which is captured by the overview camera 24 (as shown in FIG. 2), thus verifying that the inspector is acquiring the VIN image from the proper vehicle. Simultaneously, the test supervisor can view a second image 204 in the lower portion of the data screen 200a which is captured by the digital video capture equipment to ensure that the scanned or input VIN is the same as that displayed.

Furthermore, in this preferred implementation of the method and system of the present invention, to further verify the identity of the vehicle, the inspector can use the digital video capture equipment (which is integrally linked to the mobile computing device 20 shown in FIG. 2) to also capture an image of the vehicle's license plate, as indicated by block 114 of FIG. 3. If the displayed image of the license plate is consistent with the prior information and data, as determined at decision 116, the testing procedure continues. If not, the test can be terminated. As with the image of the VIN, the image of the license plate can also be retained for record-keeping purposes associated with the particular I/M program.

Referring again to FIG. 4, with respect to the verification of the license plate, the test supervisor can view a first image 206 in the lower portion of the data screen 200*a* which is captured by the overview camera 24 (as shown in FIG. 2), thus verifying that the inspector is acquiring the license plate image from the proper vehicle. Simultaneously, the test supervisor can view a second image 208 of the license plate itself, as captured by the digital video capture equipment.

Once the identification of the vehicle has been appropriately verified through examination and recordation of the VIN and license plate, the inspector must get inside of the vehicle, and connect the OBD scanning device (which is integrally linked to the mobile computing device 20 as shown in FIG. 2) to the OBD connector of the vehicle, as indicated by block 118 of FIG. 3. The OBD connector is usually located beneath the dashboard on the driver's side of the vehicle, or a similar, reasonably accessible location.

During the test, the inspector is first required to report the status of the Malfunction Indicator Lamp ("MIL") in several different situations. This series of steps is commonly referred to as the "bulb check." First, the MIL will be checked with the key switch in the "on" position, but with the engine off, as indicated by block 120 of FIG. 3. As shown in FIG. 4, a first image 210 is captured by the overview camera 24 (as shown in FIG. 2) and displayed for the remote supervisor, thus verifying that the inspector is in the vehicle, and a second image 212 of the dashboard indicators is captured by the digital video capture equipment to verify that the key switch is in the "on" position, but the engine is off. Assuming the test supervisor can verify this operation of the vehicle, as indicated by decision 122, the testing procedure continues. If not, the test can be terminated.

Then, the MIL is tested with the key switch "on" and the engine cranking, as indicated by block 124 of FIG. 3. As shown in FIG. 4, a first image 214 is captured by the overview camera 24 (as shown in FIG. 2) and displayed for the remote supervisor, thus verifying that the inspector is still in the vehicle, and a second image 216 of the dashboard indicators is captured by the digital video capture equipment to verify that the key switch is in the "on" position, with the engine cranking. Assuming the test supervisor can verify this operation of the vehicle, as indicated by decision 126, the testing procedure continues. If not, the test can be terminated.

This portion of the "bulb check" ensures that the MIL is functional and operating properly.

After the first two portions of the "bulb check" have been completed, the inspector will then turn the engine on, in an idling mode, as indicated by block 128 of FIG. 3. As shown in FIG. 4, a first image 218 is captured by the overview camera 24 (as shown in FIG. 2) and displayed for the remote supervisor, thus verifying that the inspector is still in the vehicle, and a second image 220 of the dashboard indicators is captured by the digital video capture equipment to verify that the engine is idling. While the engine is running, the status of the MIL will indicate if the OBD unit of the vehicle has detected any malfunctions. Furthermore, assuming the test supervisor can make this final verification, as indicated by decision 130 of FIG. 3, the actual OBD testing and detailed reporting of such testing can be completed.

Completing the OBD testing process may be best understood by reference to FIGS. 4–6, which are representative examples of data screens displayed at the remote overview location 10 for the test supervisor. As described above, images captured by the overview camera 24 (as shown in FIG. 2) and the digital video capture equipment are displayed in the lower portion of the data screen 200*a* of FIG. 4 for remote verification that the inspector has taken all appropriate steps in verifying the identity of the vehicle and conducting the inspection. In the upper portion of the data screen 200*a* of FIG. 4 is a frame 230 that displays information about various aspects of the testing process. In this regard, there is a series of tabs, generally indicated by reference numeral 232, that allows the test supervisor to select what type of information is be displayed in the frame 230. In FIG. 4, the tab labeled "General Information" 232*a* has been selected. As a result, displayed in the frame 230 is general information about the inspections that the test supervisor has been responsible for, including, for example, the number of inspections completed, the number of inspections accepted by the test supervisor, and the number of inspections approved or disapproved by the test supervisor.

Although not shown in the Figures, by selecting the tab labeled "Vehicle Information" 232*b*, displayed in the frame 230 for review by the test supervisor is information specific to the vehicle being inspected. For example, it is contemplated and preferred that a photograph or depiction of the location of the OBD Data Link Connector ("DLC") for the particular vehicle be displayed in the frame 230 upon selection of tab 232*b*.

By selecting the tab labeled "OBD Test Information" 232*c*, displayed in the frame 230 for review by the test supervisor is information associated with the OBD test itself, as shown in the representative data screen 200*b* of FIG. 5. Specifically, displayed in the frame 230 are the detailed results of the OBD test. A table 234 in the left pane of the frame 230 identifies the condition of the "readiness codes" reported by each electronic control unit ("ECU") of the vehicle. In this regard, vehicles may be equipped with more than one ECU. In this example, the vehicle being inspected is equipped with two ECUs. As shown in the representative example of FIG. 5, the test supervisor can view the readiness codes and confirm that the examination of each of the vehicle components relevant to emissions testing has been completed. A window 236 in the right pane of the frame 230 displays any diagnostic trouble code ("DTC"), as well as the commanded status of the MIL. In the representative example of FIG. 5, no such trouble codes have been reported and displayed to the test supervisor. Referring again to the flow chart of FIG. 3, such review of the OBD test information by the test supervisor is indicated by box 132.

Finally, by selecting the tab labeled "Inspection Approval\Denial" 232*d*, the test supervisor can approve or deny the inspection, as shown in the representative data screen 200*c* of FIG. 6. As shown in the frame 230 of FIG. 6, the test results are summarized, including indication of the status of the MIL at all relevant stages of the test and confirmation of the positive conditions of the readiness codes. Assuming that the test supervisor observed no irregular activities during the testing process, by selecting the button labeled "Approve" 240, the test supervisor can approve the test, and such approval is communicated to the inspector. If the test supervisor determines that the OBD test was not proper (e.g., suspicion of fraud, inadequate testing, or equipment malfunction), he can select the button labeled "Disapprove" 242. Although not shown in the Figures, it is contemplated and preferred that selection of the "Disapprove" button would cause a second window to be displayed in the frame 230 to allow the test supervisor to select or enter specific comments or reasons for the disapproval of the test for communication back to the inspector and for purposes of record-keeping. Referring again to the flow chart of FIG. 3, the decision as to whether to accept or reject the OBD inspection is indicated by decision 134.

Although the disapproval described above is made at the conclusion of the testing process, as mentioned above and described with reference to FIG. 3, the testing procedure may be terminated at various decisional points, not only at the end of the testing process. In this regard, through the software interface and selection of the tab labeled "Inspection Approval\Denial" 232d (as shown in FIG. 6), the test supervisor can terminate the test at any time.

In any event, after approval or disapproval of the OBD test and the exchange of any additional information (e.g., an encrypted compliance certificate number, sticker number, etc.), the communication link between the inspector and the remote test supervisor is severed or otherwise disconnected, and the test supervisor is then available to monitor another test location. And, as mentioned above, any data to be retained for record-keeping purposes associated with the particular I/M program is saved and stored at the remote overview location 10. This data can be subsequently transmitted to a data management facility the governmental body has chosen to track inspection records and results.

As a further refinement of the above-described method and system, throughout the OBD testing process, it is contemplated and preferred that the software associated with the mobile computing device 20 be capable of providing answers to frequently asked questions that the inspector may have. Furthermore, if more in-depth information is required due to equipment malfunction, etc., it is contemplated and preferred that the inspector will also be able to solicit feedback from the test supervisor, such as, for example, the location of the OBD connector. Such communication may be in the form of audio communications with the test supervisor and/or other modes of communication. Such communications may be accomplished in conjunction with the transfer of data and information through the above-described data transfer equipment 22 between the inspection location 12 and the remote overview location 10. Alternatively, such communications could be separate and apart from the data communication, such as audio communications through a telephone line. Similarly, through such communications, the remote test supervisor would be able to contact the inspector should the need arise.

As another refinement, it is contemplated and preferred that each inspection location be outfitted with the proper equipment to accept the test fee from the vehicle owner. Facilities for verification of the test results, such as a receipt or vehicle inspection report, are also preferably provided at the inspection location.

Finally, although the method and system of the present invention has been described for use with OBD testing, its application is not limited to OBD testing and indeed can be used in connection with other forms of decentralized vehicle emissions testing.

It will be obvious to those skilled in the art that other modifications may also be made to the preferred embodiment described herein without departing from the spirit and scope of the present invention.

What is claimed is:

1. A system for vehicle emissions testing, comprising:

at least one remote supervisory location; and a plurality of inspection locations, each of said inspection locations including equipment for conducting emissions testing of a vehicle through connection of an OBD scanning device to the OBD unit of the vehicle and data transfer equipment for transmitting information and data associated with the emissions testing to said remote supervisory location;

wherein an overview camera is installed at each of said inspection locations for providing video images of each said inspection location to said remote supervisory location through said data transfer equipment for substantially real-time monitoring of the emissions testing by a supervisor; and wherein the equipment for conducting emissions testing includes a means for communicating test data to said data transfer equipment for subsequent transmission to said remote supervisory location for review by the supervisor.

2. A system for vehicle emissions testing as recited in claim 1, wherein the equipment for conducting emissions testing comprises a mobile computing device and associated software, said mobile computing device including the OBD scanning device for connecting to the OBD unit of the vehicle and said means for communicating test data to said data transfer equipment, and further including substantially portable video capture equipment which allows for capture and transmission of images associated with vehicle emissions testing though said means for communicating test data to said data transfer equipment for subsequent transmission to said remote supervisory location.

3. A system for vehicle emissions testing as recited in claim 2, wherein said mobile computing device further includes bar code recognition hardware and software.

4. A system for vehicle emissions testing as recited in claim 1, wherein said means for communicating test data to said data transfer equipment is a radio transceiver.

5. A method of vehicle emissions testing, comprising:

accepting a particular vehicle at an inspection station for emissions testing;

assigning supervision and substantially real-time monitoring of the emissions testing of the vehicle to a supervisor at a remote location;

verifying identification of the vehicle prior to or simultaneous with the emission testing, including transmitting an image of the VIN to the supervisor at said remote location;

communicating data associated with the identification of the vehicle to the supervisor;

conducting the emissions test while (a) transmitting video images of the emissions test to the supervisor at said remote location, and (b) transmitting data associated with the emissions test to the supervisor at said remote location.

6. A method as recited in claim 5, wherein verifying identification of the vehicle further includes transmitting an image of the license plate of the vehicle to the supervisor at said remote location.

7. A system for vehicle emissions testing, comprising:

at least one remote supervisory location; and a plurality of inspection locations, each of said inspection locations including equipment for conducting emissions testing of a vehicle and data transfer equipment for transmitting information and data associated with the emissions testing to said remote supervisory location;

wherein an overview camera is installed at each of said inspection locations for providing video images of each said inspection location to said remote supervisory location through said data transfer equipment during the emissions testing;

wherein the equipment for conducting emissions testing includes an OBD scanning device for connecting to the OBD unit of the vehicle; and wherein the equipment for conducting emissions testing further includes a means for communicating test data to said data transfer equipment for subsequent transmission to said remote supervisory location.

8. A system for vehicle emissions testing as recited in claim 7, wherein said means for communicating test data to said data transfer equipment is a radio transceiver.

9. A system for monitoring vehicle emissions testing, comprising:

a plurality of inspection locations, each of said inspection locations having equipment for conducting emissions testing of a vehicle;

at least one remote supervisory location;

a video communications link between each of said inspection stations and said remote supervisory location, allowing a supervisor at the remote supervisory location to monitor the emissions testing of a particular vehicle;

a data communications link between each of said inspection stations and said remote supervisory location, allowing transfer of data associated with emissions testing from each of said inspection stations to said remote supervisory location; and an audio communications link between each of said inspection stations and said remote supervisory location, allowing for verbal communication between an inspector at each of said inspection stations and the supervisor at the remote supervisory location.

10. A system as recited in claim 9, wherein an overview camera is installed at each of said inspection locations for providing video images of each said inspection location to said remote supervisory location through said video communications link.

11. A system as recited in claim 10, wherein the equipment for conducting emissions testing located at each of said inspection locations includes substantially portable video capture equipment which allows for capture and transmission of images associated with vehicle emissions testing from each said inspection location to said remote supervisory location through said video communications link.

12. A method of vehicle emissions testing, comprising:

accepting a particular vehicle at an inspection station for emissions testing;

assigning supervision of the emissions testing of the vehicle to a supervisor at a remote location;

verifying identification of the vehicle;

communicating data associated with the identification of the vehicle to the supervisor;

conducting the emissions test through connection of an OBD scanning device to the OBD unit of the vehicle and while (a) transmitting video images of the emissions test to the supervisor at said remote location, and (b) transmitting data associated with the emissions test to the supervisor at said remote location.

13. A method as recited in claim 12, wherein data from the OBD scanning device is transmitted to the supervisor at said remote location.

14. A method as recited in claim 12, wherein said test supervisor is in audio communication with said inspection location.

* * * * *